United States Patent
Holland et al.

(10) Patent No.: US 11,614,625 B2
(45) Date of Patent: Mar. 28, 2023

(54) SYSTEMS, ARTICLES, AND METHODS FOR INTEGRATING HOLOGRAPHIC OPTICAL ELEMENTS WITH EYEGLASS LENSES

(71) Applicant: GOOGLE LLC, Mountain View, CA (US)

(72) Inventors: Lloyd Frederick Holland, Kitchener (CA); Matthew Bailey, Kitchener (CA)

(73) Assignee: Google LLC, Mountain View, CA (US)

( * ) Notice: Subject to any disclaimer, the term of this patent is extended or adjusted under 35 U.S.C. 154(b) by 21 days.

(21) Appl. No.: 17/225,787

(22) Filed: Apr. 8, 2021

(65) Prior Publication Data

US 2021/0223554 A1 Jul. 22, 2021

Related U.S. Application Data

(63) Continuation of application No. 17/108,794, filed on Dec. 1, 2020, which is a continuation of application
(Continued)

(51) Int. Cl.
*G02B 27/01* (2006.01)
*G03H 1/02* (2006.01)
(Continued)

(52) U.S. Cl.
CPC ...... *G02B 27/0172* (2013.01); *B29D 11/0048* (2013.01); *B29D 11/00317* (2013.01);
(Continued)

(58) Field of Classification Search
CPC ..... G03H 2001/043; G03H 2001/0434; G03H 2001/0439; G03H 2250/37; G03H 2260/12; G03H 2270/55; G03H 1/0248; G03H 1/0256; G03H 1/0402; G02B 1/041; G02B 3/0087; G02B 13/06; G02B 2003/0093; G02B 27/0172; G02B 27/0101;
(Continued)

(56) References Cited

U.S. PATENT DOCUMENTS 4,641,934 A * 2/1987 Freeman .................. A61F 2/14
 623/6.31
8,922,898 B2 * 12/2014 Legerton .......... B29D 11/00644
 359/630
(Continued)

OTHER PUBLICATIONS

Non-Final Office Action dated Jun. 22, 2022 for U.S. Appl. No. 17/108,794, 12 pages.

*Primary Examiner* — Jade R Chwasz

(57) ABSTRACT

Systems, articles, and methods integrate photopolymer film with eyeglass lenses. One or more hologram(s) may be recorded into/onto the photopolymer file to enable the lens to be used as a transparent holographic combiner in a wearable heads-up display employing an image source, such as a microdisplay or a scanning laser projector. The methods of integrating photopolymer film with eyeglass lenses include: positioning photopolymer film in a lens mold and casting the lends around the photopolymer film; sandwiching photopolymer film in between two portions of a lens applying photo polymer film to a concave surface of a lens and/or affixing a planar carrier (with photopolymer film thereon) to two points across a length of a concave surface of a lens.

16 Claims, 9 Drawing Sheets

Related U.S. Application Data

No. 15/841,775, filed on Dec. 14, 2017, now Pat. No. 10,877,272, which is a continuation of application No. 15/256,148, filed on Sep. 2, 2016.

(60) Provisional application No. 62/214,600, filed on Sep. 4, 2015.

(51) Int. Cl.
  *G03H 1/04* (2006.01)
  *B29D 11/00* (2006.01)
  *G02C 7/08* (2006.01)
  *G02C 11/00* (2006.01)

(52) U.S. Cl.
  CPC .. *B29D 11/00413* (2013.01); *B29D 11/00432* (2013.01); *B29D 11/00461* (2013.01); *B29D 11/00548* (2013.01); *B29D 11/00865* (2013.01); *G02B 27/0101* (2013.01); *G02B 27/0103* (2013.01); *G03H 1/0248* (2013.01); *G03H 1/0256* (2013.01); *G03H 1/0402* (2013.01); *B29D 11/00442* (2013.01); *B29K 2995/0018* (2013.01); *G02B 2027/0107* (2013.01); *G02B 2027/0109* (2013.01); *G02B 2027/0178* (2013.01); *G02C 7/086* (2013.01); *G02C 11/10* (2013.01); *G03H 2001/043* (2013.01); *G03H 2001/0434* (2013.01); *G03H 2001/0439* (2013.01); *G03H 2250/37* (2013.01); *G03H 2260/12* (2013.01); *G03H 2270/55* (2013.01)

(58) Field of Classification Search
  CPC ........ G02B 27/0103; G02B 2027/0107; G02B 2027/0109; G02B 2027/0178; B29D 11/00317; B29D 11/00413; B29D 11/00432; B29D 11/00461; B29D 11/0048; B29D 11/00548; B29D 11/00865; B29D 11/00442; B29K 2995/0018; G02C 7/086; G02C 11/10
  USPC .............................................. 359/14, 15, 19
  See application file for complete search history.

(56) References Cited

U.S. PATENT DOCUMENTS

| | | | |
|---|---|---|---|
| 9,709,714 B2 | 7/2017 | Aono et al. | |
| 2002/0001108 A1* | 1/2002 | Yeo | G02B 5/1814 |
| | | | 359/361 |
| 2002/0093701 A1* | 7/2002 | Zhang | G02C 7/043 |
| | | | 359/15 |

* cited by examiner

SYSTEMS, ARTICLES, AND METHODS FOR INTEGRATING HOLOGRAPHIC OPTICAL ELEMENTS WITH EYEGLASS LENSES

CROSS-REFERENCE TO RELATED APPLICATIONS

The present application is a continuation application of U.S. patent application Ser. No. 17/108,794, entitled "SYSTEMS, ARTICLES, AND METHODS FOR INTEGRATING HOLOGRAPHIC OPTICAL ELEMENTS WITH EYEGLASS LENSES", and filed on Dec. 1, 2020, which is a continuation application of U.S. patent application Ser. No. 15/841,775, entitled "SYSTEMS, ARTICLES, AND METHODS FOR INTEGRATING HOLOGRAPHIC OPTICAL ELEMENTS WITH EYEGLASS LENSES", and filed on Dec. 14, 2017, which is a continuation of U.S. patent application Ser. No. 15/256,148, entitled "SYSTEMS, ARTICLES, AND METHODS FOR INTEGRATING HOLOGRAPHIC OPTICAL ELEMENTS WITH EYEGLASS LENSES", and filed on Sep. 2, 2016, which claims priority to U.S. Provisional Patent Application No. 62/214,600, entitled "SYSTEMS, ARTICLES, AND METHODS FOR HOLOGRAPHIC EYEGLASS LENSES", and filed on Sep. 4, 2015, the entirety of which are incorporated by reference herein.

TECHNICAL FIELD

The present systems, articles, and methods generally relate to holographic eyeglass lenses and particularly relate to integrating photopolymer film with an eyeglass lens for use as a holographic optical element in a wearable heads-up display.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

A challenge in the design of most wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

Photopolymer

A photopolymer is a material that changes one or more of its physical properties when exposed to light. The changes may be manifested in different ways, including structurally and/or chemically. Photopolymer materials are often used in holography as the film or medium within or upon which a hologram is recorded. For example, a photopolymer film may be controllably exposed/illuminated with a particular interference pattern of light to cause surface relief patterns to form in/on the photopolymer film, the surface relief patterns conforming to the interference pattern of the illuminating light. A photopolymer film may comprise only photopolymer material itself, or it may comprise photopolymer carried on or between any or all of: a substrate, such as triacetate and/or polyamide and/or polyimide and/or polycarbonate, and/or a fixed or removable protective cover layer. Many examples of photopolymer film are available in the art today, such as DuPont HRF photopolymer film, Darol™ photopolymer from Polygrama Inc., or Bayfol® HX film from Bayer AG.

Eyeglass Lenses

A typical pair of eyeglasses or sunglasses includes two lenses, a respective one of the lenses positioned in front of each eye of the user when the eyeglasses/sunglasses are worn on the user's head. In some alternative designs, a single elongated lens may be used instead of the two separate lenses, the single elongated lens spanning in front of both eyes of the user when the eyeglasses/sunglasses are worn on the user's head. The lenses of a pair of eyeglasses are typically colorless and optically transparent while the lenses of a pair of sunglasses are typically colored or tinted in some way to partially attenuate the light that passes therethrough. However, throughout the remainder of this specification and the appended claims, the terms "eyeglasses" and "sunglasses" are used substantially interchangeably unless the specific context requires otherwise.

An eyeglass lens may be formed of glass, or a non-glass (e.g., plastic) material such as polycarbonate, CR-39, Hivex®, or Trivex®. An eyeglass lens may be a non-prescription lens that transmits light essentially unaffected or provides a generic function (such as magnification) to images that pass therethrough. Alternatively, an eyeglass lens may be a prescription lens (usually user-specific) that compensates for deficiencies in the user's vision by imparting specific one or more optical function(s) to transmitted light. Generally, an eyeglass lens begins as a lens (or a lens "blank") and a prescription may optionally be applied by deliberately shaping the curvature on either or both of the outward-facing surface and/or the inward-facing surface of the lens. It is most common for a prescription to be applied by shaping the curvature of the inward-facing surface (i.e., the surface that is most proximate the user's eye when worn) of a lens because such allows the outward-facing aesthetics of the eyeglasses to remain substantially homogenized across different users with different prescriptions.

BRIEF SUMMARY

A method of manufacturing a lens for use in a wearable heads-up display may be summarized as including: providing a lens mold having a cavity; positioning a photopolymer film within the cavity of the lens mold; casting a lens-forming fluid into the cavity; and curing the lens-forming fluid within the cavity to form a lens having the photopolymer film embedded therein, the lens having dimensions and a geometry at least approximately equal to the cavity. The method may further include applying a curvature to the photopolymer film before casting the lens-forming fluid into the cavity. The method may further include applying an optical adhesive to at least one surface of the photopolymer film before positioning the photopolymer film within the cavity of the lens mold. The method may further include recording a hologram into the photopolymer film before positioning the photopolymer film within the cavity of the lens mold, wherein the hologram compensates for an optical effect of the lens. The method may further include recording a hologram into the photopolymer film embedded in the lens after curing the lens-forming fluid within the cavity to form the lens, wherein: positioning the photopolymer film within the cavity of the lens mold; casting the lens-forming fluid into the cavity; and curing the lens-forming fluid within the cavity to form the lens having the photopolymer film embedded therein, are all performed in a dark environment. The method may further include applying an eyeglass prescription to the lens after curing the lens-forming fluid within the cavity to form the lens, for example by removing material from a lens blank and/or polishing per the eyeglass prescription. The method may further include annealing the lens at temperature between 50° C. and 100° C. for at least thirty minutes.

A lens for use in a wearable heads-up display may be summarized as having been prepared by a process comprising the acts of: providing a lens mold having a cavity; positioning a photopolymer film within the cavity of the lens mold; casting a lens-forming fluid into cavity; and curing the lens-forming fluid within the cavity to form a lens having the photopolymer film embedded therein, the lens having dimensions and a geometry at least approximately equal to the cavity.

A method of manufacturing a lens for use in a wearable heads-up display may be summarized as including: providing a front half portion of a lens; providing a rear half portion of the lens; providing a photopolymer film; applying an optical adhesive to at least one surface selected from a group consisting of: a surface of the front half portion of the lens, a surface of the rear half portion of the lens, and a surface of the photopolymer film; positioning the photopolymer film in between the front half portion of the lens and the rear half portion of the lens; and pressing the front half portion of the lens and the rear half portion of the lens together with the photopolymer film sandwiched therebetween. The method may further include applying a curvature to the photopolymer film before positioning the photopolymer film in between the front half portion of the lens and the rear half portion of the lens. The method may further include recording a hologram into the photopolymer film before positioning the photopolymer film in between the front half portion of the lens and the rear half portion of the lens, wherein the hologram compensates for at least one optical effect introduced by at least one of the front half portion of the lens, a curvature of the photopolymer film, and/or the rear half portion of the lens. The method may further include recording a hologram into the photopolymer film after pressing the front half portion of the lens and the rear half portion of the lens together with the photopolymer film sandwiched therebetween, wherein: applying the optical adhesive to at least one surface selected from the group consisting of: the surface of the front half portion of the lens, the surface of the rear half portion of the lens, and the surface of the photopolymer film; positioning the photopolymer film in between the front half portion of the lens and the rear half portion of the lens; and pressing the front half portion of the lens and the rear half portion of the lens together with the photopolymer film sandwiched therebetween, are all performed in a dark environment. The method may further include applying an eyeglass prescription to at least one of the front half portion of the lens and/or the rear half portion of the lens after pressing the front half portion of the lens and the rear half portion of the lens together with the photopolymer film sandwiched therebetween.

A lens for use in a wearable heads-up display may be summarized as having been prepared by a process comprising the acts of: providing a front half portion of a lens; providing a rear half portion of the lens; providing a photopolymer film; applying an optical adhesive to at least one surface selected from a group consisting of: a surface of the front half portion of the lens, a surface of a rear half portion of the lens, and a surface of the photopolymer film; positioning the photopolymer film in between the front half portion of the lens and the rear half portion of the lens; and pressing the front half portion of the lens and the rear half portion of the lens together with the photopolymer film sandwiched therebetween.

A method of adapting a lens for use in a wearable heads-up display may be summarized as including: providing a lens having a concave surface; and applying a photopolymer film to the concave surface of the lens, wherein the photopolymer film adopts a concave curvature at least approximately equal to a curvature of the concave surface of the lens. Applying a photopolymer film to the concave surface of the lens may include: providing the photopolymer film; applying an optical adhesive to at least one surface selected from a group consisting of: the concave surface of the lens and a surface of the photopolymer film; pressing the concave surface of the lens and the surface of the photopolymer film together; and curing the optical adhesive. Pressing the concave surface of the lens and the surface of the photopolymer film together may include warming the photopolymer film to a temperature below about 80 degrees Celsius.

Applying the photopolymer film to the concave surface of the lens may include: applying the photopolymer film to a surface of a carrier; curving the carrier to provide a concave curvature that at least approximately matches the concave surface of the lens; applying an optical adhesive to at least one surface selected from a group consisting of: the concave surface of the lens, a surface of the photopolymer film, and a surface of the carrier; pressing the concave surface of the lens and the carrier, with the photopolymer film thereon, together to sandwich the optical adhesive; and curing the optical adhesive. Curving the carrier, with the photopolymer film thereon, may include: warming the photopolymer film to a temperature below about 80 degrees Celsius; and pressing the carrier, with the photopolymer film thereon, over a curved surface, the curved surface having a curvature that at least approximately matches or mates with the concave surface of the lens. The method may further include removing the carrier.

Applying a photopolymer film to the concave surface of the lens may include depositing the photopolymer film directly on the concave surface of the lens by at least one thin film deposition technique selected from a group consisting of: spin-coating, dip-coating, and vacuum deposition. The method may further include applying an eyeglass prescription to the lens before applying the photopolymer film to the concave surface of the lens. The method may further include recording a hologram into the photopolymer film before applying the photopolymer film to the concave surface of the lens, wherein the hologram compensates for an optical effect of the lens. The method may further include recording a hologram into the photopolymer film after applying the photopolymer film to the concave surface of the lens, wherein: applying a photopolymer film to the concave surface of the lens is performed in a dark environment.

A lens for use in a wearable heads-up display may be summarized as having been prepared by a process comprising the acts of: providing a lens having a concave surface; and applying a photopolymer film to the concave surface of the lens, wherein the photopolymer film adopts a concave curvature at least approximately equal to a curvature of the concave surface of the lens.

A method of adapting a lens for use in a wearable heads-up display may be summarized as including: providing a lens having a concave surface; applying a photopolymer film to a planar carrier, wherein the planar carrier is optically transparent; and affixing at least two points of the planar carrier to at least two respective points on the concave surface of the lens, the at least two points of the planar carrier at opposite ends of at least a portion of a length of the planar carrier. Affixing at least two points of the planar carrier to at least two respective points on the concave surface of the lens may define a cavity in between the concave surface of the lens and the planar carrier. Affixing at least two points of the planar carrier to at least two respective points on the concave surface of the lens may include adhering at least two points of the planar carrier to at least two respective points on the concave surface of the lens using an optical adhesive. The method may further include applying an eyeglass prescription to the lens before affixing the at least two points of the planar carrier to the at least two respective points on the concave surface of the lens. The method may further include recording a hologram into the photopolymer film before affixing the at least two points of the planar carrier to the at least two respective points on the concave surface of the lens, wherein the hologram compensates for at least one of an optical effect of the lens and/or a curvature of the photopolymer film. The method may further include recording a hologram into the photopolymer film after affixing the at least two points of the planar carrier to the at least two respective points on the concave surface of the lens, wherein: applying the photopolymer film to the planar carrier; and affixing at least two points of the planar carrier to at least two respective points on the concave surface of the lens, are both performed in a dark environment.

The method may further include: forming a recess in the concave surface of the lens; and positioning the planar carrier, with the photopolymer film applied thereto, within the recess. In this case, affixing at least two points of the planar carrier to at least two respective points on the concave surface of the lens may include affixing the planar carrier within the recess in the concave surface of the lens.

A lens for use in a wearable heads-up display may be summarized as having been prepared by a process comprising the acts of: providing a lens having a concave surface; applying a photopolymer film to a planar carrier, wherein the planar carrier is optically transparent; and affixing at least two points of the planar carrier to at least two respective points on the concave surface of the lens, the at least two points of the planar carrier at opposite ends of at least a portion of a length of the planar carrier.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
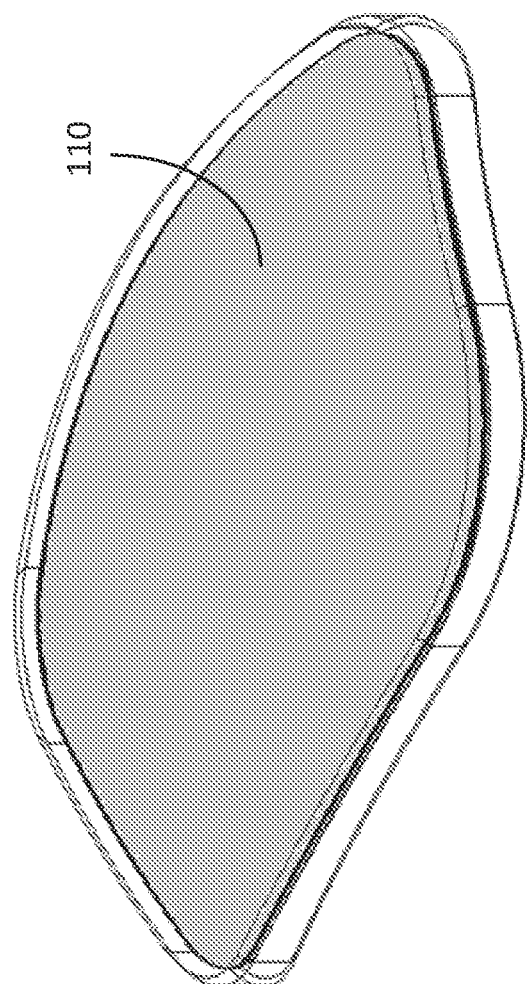
FIG. 1 is a perspective view showing an eyeglass lens with a photopolymer film integrated therewith in accordance with the present systems, articles, and methods.
Figure 1:

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with eyeglass lenses and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, articles, and methods that integrate photopolymer film with an eyeglass lens. Such enable a holographic optical element ("HOE") to be provided with the form factor and rigidity of an eyeglass lens (optionally with or without a prescription applied to the lens) and are particularly well-suited for use as transparent combiners in wearable heads-up displays ("WHUDs") that make use of a near-eye HOE. Examples of WHUD architectures that may employ the present systems, articles, and methods for eyeglass lenses with integrated photopolymer film include, without limitation: US Patent Application Publication US 2015-0205134 A1, U.S. Non-Provisional patent application Ser. No. 14/749,341 (now US Patent Application Publication US 2015-0378164 A1), U.S. Provisional Patent Application Ser. No. 62/117,316 (now US Patent Application Publication US 2016-0238845 A1 and U.S. Non-Provisional patent application Ser. Nos. 15/046,234 and 15/046,254), U.S. Provisional Patent Application Ser. No. 62/134,347 (now U.S. Non-Provisional patent application Ser. No. 15/070,887), U.S. Provisional Patent Application Ser. No. 62/156,736 (now U.S. Non-Provisional patent application Ser. Nos. 15/145,576, 15/145,609, and 15/145,583), and Provisional Patent Application Ser. No. 62/167,767 (now U.S. Non-Provisional patent application Ser. Nos. 15/167,458, 15/167,472, and 15/167,484). The systems, articles, and methods described herein are advantageous for use in WHUD architectures that employ a near-eye HOE (such as those referenced above) because they enable aesthetically-appealing lens designs that are capable of providing high-quality images to the user without limiting the user's ability to see their external environment. In some implementations, a WHUD that includes a near-eye HOE may be referred to as a holographic display based on the inclusion of at least one HOE in the optical path of the display, independent of whether or not the display is operable to display three-dimensional content.

FIG. 1 is a perspective view showing an eyeglass lens 100 with a photopolymer film 110 integrated therewith in accordance with the present systems, articles, and methods. Photopolymer film 110 is embedded within (i.e., as an inner layer sandwiched between or encapsulated by lens material) an inner volume of lens 100 in accordance with an implementation of the present systems, articles, and methods, though in alternative implementations photopolymer film 110 may be carried by an outer surface of lens 100.

Eyeglass lens 100 is particularly well-suited for use in a WHUD that implements a near-eye HOE. One or more holograms may be recorded into photopolymer film 110 (either before or after photopolymer film 110 is embedded in lens 100 as discussed in more detail later on) and used to, for example, (re)direct light corresponding to one or more virtual image(s) into the user's field of view. The light may originate from an image source, such as a microdisplay or a scanning laser projector. Throughout this specification, exemplary processes by which photopolymer film 110 may be integrated with (i.e., in or on) lens 100, and the corresponding product(s) produced by such processes, are described.

Figure 2:
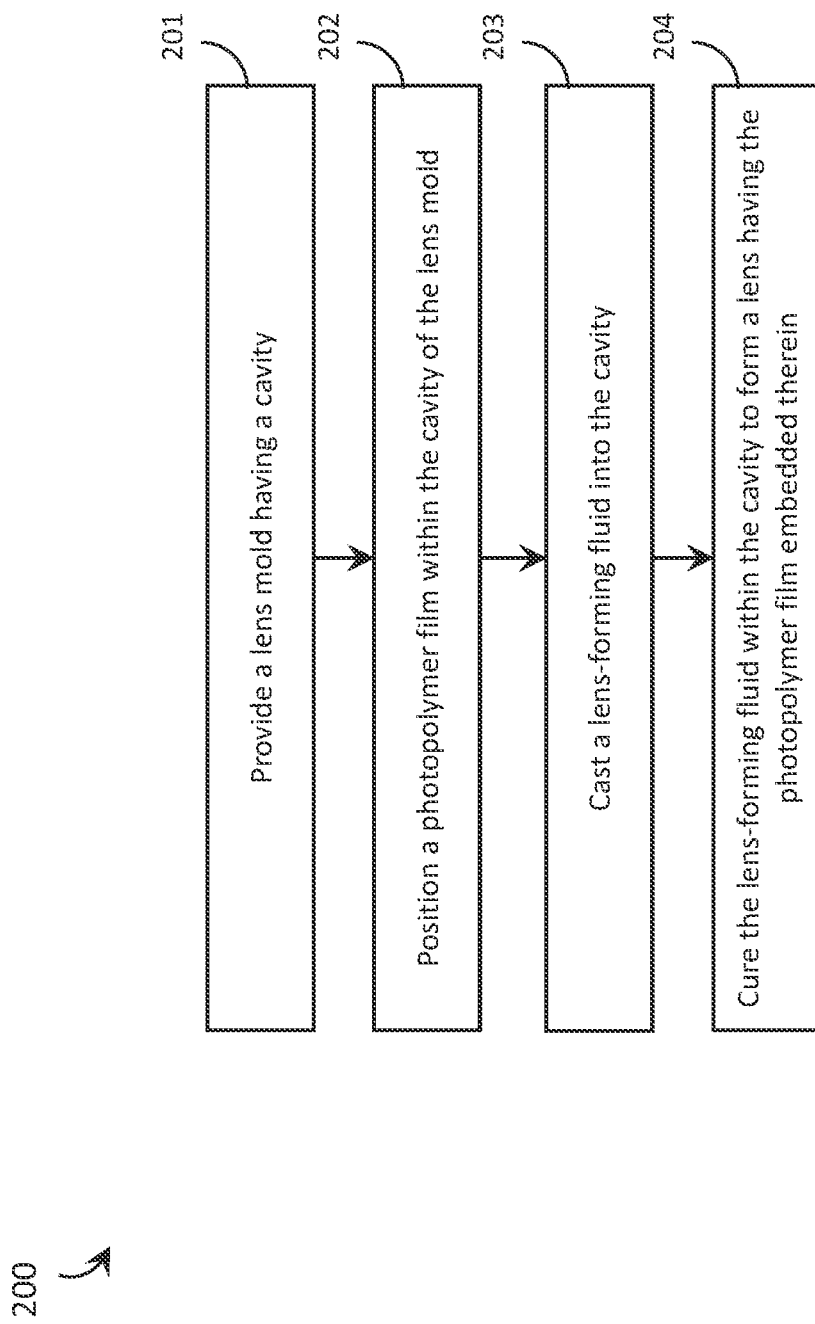
FIG. 2 is a flow-diagram showing an exemplary method of manufacturing a lens for use in a wearable heads-up display in accordance with the present systems, articles, and methods.

FIG. 2 is a flow-diagram showing an exemplary method 200 of manufacturing a lens for use in a WHUD in accordance with the present systems, articles, and methods.

Method 200 includes four acts 201, 202, 203, and 204, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

Method 200 includes a molding process and produces a molded lens with photopolymer film embedded therein.

At 201, a lens mold is provided. The lens mold has a cavity (i.e., a hollow inner volume) that is the size and geometry of an eyeglass lens. The size and geometry of the cavity may be at least approximately similar to that of an eyeglass lens "blank" to allow one or more portion(s) of the surface(s) of the molded lens produced by method 200 to be reshaped (e.g., by etching or grinding away lens material) in order to optionally apply a prescription to the resulting molded lens. Alternatively, the lens mold cavity itself may be sized and dimensioned to impart a specific prescription curvature on either or both surfaces of the lens. The lens mold may be formed of a single piece of material with the cavity therein or multiple pieces (e.g., two halves, two or more portions) of material that are coupled together to form the cavity therebetween.

Throughout this specification and the appended claims, the phrase "at least approximately" is often used, in particular in relation to the size, dimensions, and/or geometry of a cavity in a lens mold. A person of skill in the art of injection molding will understand that a form that is manufactured by a molding process generally adopts the same size, dimensions, and geometry of the mold cavity in which it is formed; however, slight discrepancies and/or variations can arise in the molding process that may cause the size, dimensions, and/or geometry of a molded form to differ slightly from the size, dimensions, and/or geometry of the mold cavity in which it is formed. In particular, some curing processes can cause a molded shape to shrink or expand (generally less than 10% in the lens industry). For these reasons, throughout this specification and the appended claims, the phrase "at least approximately" is generally used to mean "within 10%."

At 202, a photopolymer film is positioned within the cavity of the lens mold. The photopolymer film may be held substantially planar within the lens mold or, advantageously, a curvature may be applied to the photopolymer film before/while it is positioned within the cavity of the lens mold. The curvature applied to the photopolymer film may, for example, at least approximately match the curvature of one or both inner faces of the lens mold so that the photopolymer film will ultimately have a curvature that at least approximately matches that of the corresponding surface(s) of the molded lens produced by method 200. Curvature may be applied using conventional techniques for forming/shaping film, for example, by applying heat combined with either targeted air flow (e.g., a pressure differential) or a forming shape, such as a forming mold. Depending on the specific implementation, the photopolymer film may be formed/shaped to embody any form of curvature, including without limitation: a uniform curvature, a variable curvature, or one or more curved section(s) separated by one or more flat section(s). The preferred form or shape of the photopolymer film may depend on the curvature of the lens and/or on the properties of the hologram(s) to be (or already) recorded into the photopolymer film.

Optionally, a bonding agent or a bonding process be applied to at least one surface of the photopolymer film before/while the photopolymer film is positioned within the cavity of the lens mold. Exemplary bonding agents that would be suitable include optical adhesive or film primer, while an example of a bonding process that would be suitable includes a surface energy altering technique such as plasma activation. In particular, adhesion between the lens material and the photopolymer film may advantageously be designed to comply regulations (e.g., a "ball drop" test, accelerated weathering, and the like) governing eyeglass lenses, including prescription eyeglass lenses.

At 203, a lens-forming fluid (e.g., polycarbonate, CR-39, Hivex®, Trivex®, or the like) is cast into the cavity (e.g., via at least one injection port). Advantageously, the lens-forming fluid may completely fill the cavity and completely envelope, encompass, or sandwich the photopolymer film. To enable any gas (e.g., air) within the cavity to escape during filling by the lens-forming liquid, the cavity may include at least one vent port. When the cavity is first filled with lens-forming fluid but the lens-forming fluid remains uncured, the lens-forming fluid may adopt a size, the dimensions, and a geometry that are at least approximately equal to (i.e., within 1%) the size, dimensions, and geometry of the cavity in the lens mold or a nominal or specified size, dimension and/or geometry.

At 204, the lens-forming fluid is cured within the cavity to form a lens having the photopolymer film embedded therein (e.g., lens 100 with photopolymer film 110 embedded therein as shown in FIG. 1). The molded lens produced by method 200 has dimensions and/or geometry at least approximately equal to those of the cavity of the lens mold. Depending on the lens-forming fluid used, the curing process may involve a range of different mechanisms, including without limitation: exposure to UV light, exposure to heat/cold, drying by exposure to circulating gas(es), addition of one or more chemical curing agent(s) (e.g., stiffener or hardening agent), and/or passage of time.

Acts 201, 202, 203, and 204 provide a molded lens having a photopolymer film embedded therein, and such a lens may be used in a WHUD. In order to use such a lens in a WHUD, at least one corresponding hologram needs to be recorded into the photopolymer film. In accordance with the present systems, articles, and methods, one or more hologram(s) may be recorded into the photopolymer film (and accordingly method 200 may include recording one or more hologram(s) into the photopolymer film) either before or after the photopolymer film is embedded in the lens.

Prior to a hologram being recorded therein, the photopolymer films contemplated herein are necessarily photosensitive. Furthermore, while in the "unrecorded" state, photopolymer film may be sensitive to high temperatures (e.g., temperature of about 80° C. and above). Thus, if method 200 further includes recording a hologram into the photopolymer film embedded in the lens after curing the lens-forming fluid within the cavity to form the lens (i.e., after act 204), then at least acts 202, 203, and 204 of method 200 should advantageously be performed in a dark environment and at temperatures below about 80° C. in order to preserve the photosensitivity of the photopolymer film. For the purposes of the present systems, articles, and methods, the term "dark environment" is generally used to refer to an environment in which care has been taken to reduce and limit the presence of "light" (or, more generally, wavelengths of energy) to which the photopolymer is photosensitive. A person of skill in the art will appreciate that the level of darkness (i.e., ranging from "dimly lit" in which some light is still present to "pitch black" in which no light is present) required depends on both the specific photopolymer being used and the length of time that the photopolymer will be subjected to any light. Generally, the longer the photopolymer will be exposed to light the dimmer the light should be, in order to preserve the photosensitivity of unrecorded photopolymer.

After a hologram has been recorded therein, the photopolymer films contemplated herein are typically no longer photosensitive. Thus, the necessary hologram(s) may be recorded in the photopolymer film prior to acts 202, 203, and 204 of method 200 in order to remove the need to perform acts 202, 203, and 204 in a dark environment. Furthermore, the temperature sensitivity of a photopolymer film may change after a hologram has been recorded therein, enabling acts 202, 203, and/or 204 to be performed at higher temperatures (e.g., greater than 80° C. and up to about 100° C. to 120° C., depending on the specific implementation and the length of time for which the photopolymer film will remain at that temperature).

Optionally, method 200 may be extended to provide a prescription eyeglass lens for use in a WHUD. An eyeglass prescription may be applied to the lens after curing the lens-forming fluid within the cavity to form the lens per act 204. As described above, if a hologram has not already been recorded in the photopolymer film then the eyeglass prescription will need to be applied by, for example, reshaping the curvature of at least one surface of the lens in a dark environment in order to protect the photosensitivity of the photopolymer. Conversely, if a hologram is recorded in the photopolymer film prior to applying an eyeglass prescription to the lens, the prescription may be applied outside of a dark environment (i.e., in a well-lit room) but a new challenge arises: the prescription imbued in the lens may alter the incoming/outgoing properties of light impingent on and/or redirected by the hologram. Thus, if a hologram is recorded into the photopolymer before acts 202, 203, and 204 of method 200 are performed and an eyeglass prescription is going to be applied to the lens, then details of the eyeglass prescription may be established in advance and the hologram itself may be designed to accommodate or compensate for the eyeglass prescription. More generally, even if an eyeglass prescription is not going to be applied to the lens, the hologram may still be designed to accommodate and/or compensate for an optical effect of the lens and/or an optical effect of the curvature of the hologram itself when integrated with the lens.

Once a molded lens having photopolymer film embedded therein is produced via method 200, the lens may advantageously be annealed to remove internal stresses. Conventional molded lenses are typically annealed at a relatively hot temperature (e.g., greater than 100° C., such as 120° C. or more) for a relatively short time (e.g., on the order of minutes, such as 1 minute, 5 minutes, 10 minutes, or 15 minutes); however, as described above, prolonged exposure to such high temperatures can damage photopolymer film. In accordance with the present systems, articles, and methods, a molded lens having photopolymer film embedded therein (e.g., a lens manufactured by an implementation of method 200) may advantageously be annealed at a relatively low temperature (e.g., under 100° C., such as 90° C. or less) for a relatively long time (e.g., about 30 minutes or more, such as 45 minutes, an hour, 75 minutes, and so on). Annealing at a lower temperature (though still at a deliberately heated temperature above at least about 50° C.) specifically accommodates the temperature-sensitivity of the photopolymer film embedded in the molded lens and reduces the likelihood that the film will be damaged during the annealing.

Figure 3:
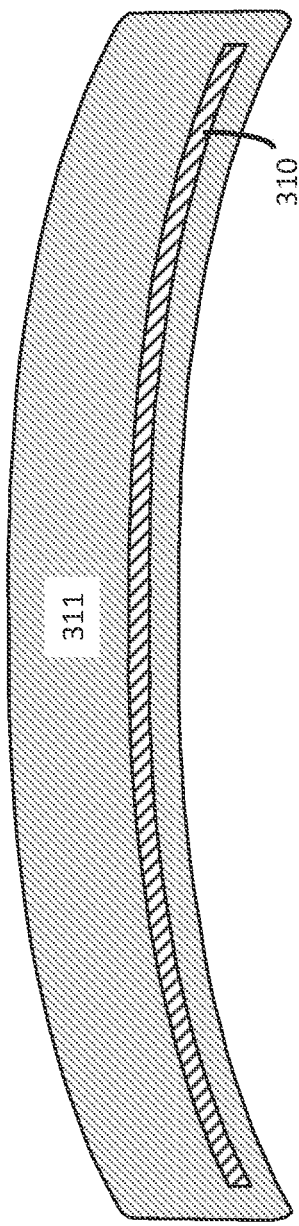
FIG. 3 is a sectional view showing a lens for use in a wearable heads-up display, the lens having been manufactured or prepared by an implementation of the method from FIG. 2.

FIG. 3 is a sectional view showing a lens 300 for use in a WHUD, lens 300 having been manufactured or prepared by an implementation of method 200. That is, FIG. 3 shows a lens 300 resulting from the acts of: providing a lens mold having a cavity; optionally shaping/forming the photopolymer film; positioning a photopolymer film within the cavity of the lens mold; casting a lens-forming fluid into the cavity; and curing the lens-forming fluid within the cavity to form a lens having the photopolymer film embedded therein, the lens having dimensions and/or geometry at least approximately equal to the cavity. Lens 300 includes a photopolymer film 310 completely encompassed by lens material 311, though in alternative implementations one or more portion(s) of photopolymer film may reach or even protrude from the perimeter of lens 300.

In the illustrated example of lens 300, photopolymer film 310 is not located in the center of lens material 311. Rather, photopolymer film 310 is positioned most proximate (e.g., a close as possible while still allowing the lens-forming fluid to flow and fill the entire cavity), and is formed to embody the same curvature as, the concave or "eye-facing" surface of lens 300. In use in a scanning laser-based WHUD, laser light may impinge on this surface of lens 300 and transmit through lens material 311 to impinge on photopolymer film 310. One or more hologram(s) in photopolymer film 310 may then redirect the laser light back towards an eye of the user. Thus, along this optical path, the laser light (i.e., the "projected display light") refracts as it enters lens material 311, travels through lens material 311, redirects (e.g., reflects, diffracts) from photopolymer film 310, travels through lens material 311, and then refracts again as it leaves lens material 311. The refractions at lens material 311 can ultimately shift the trajectory of the projected display light, and the amount of this shift may depend on the distance the projected display light travels within lens material 311. In accordance with the present systems, articles, and methods, it can be advantageous for a photopolymer film embedded in a lens (i.e., surrounded by lens material) to be positioned proximate (e.g., as close as reasonably possible) to the in-coupling/out-coupling surface of the lens (in-coupling/out-coupling with respect to projected display light) in order to reduce (e.g., minimize) the amount of lens material 311 in the optical path of the projected display light and thereby reduce (e.g., minimize) refractive effects of the lens material. Furthermore, at the point of out-coupling from the lens material 311, at least a portion of the projected display light may be reflected back inward towards photopolymer film 310, from which that portion of the projected display light may again be redirected towards the eye of the user and undesirably produce a replication or "ghosting" effect in the projected display content. The positioning of photopolymer film 310 off-center and proximate the concave or "eye-facing" surface of lens 300 (i.e., relatively more distant from the convex or "outward-facing" surface of lens 300) as illustrated in FIG. 3 can advantageously reduce such ghosting effects.

As an alternative to a mold/casting process to integrate photopolymer film with an eyeglass lens, a photopolymer film may be sandwiched in between two or more respective portions of lens material, for example using a lamination process.

Figure 4:
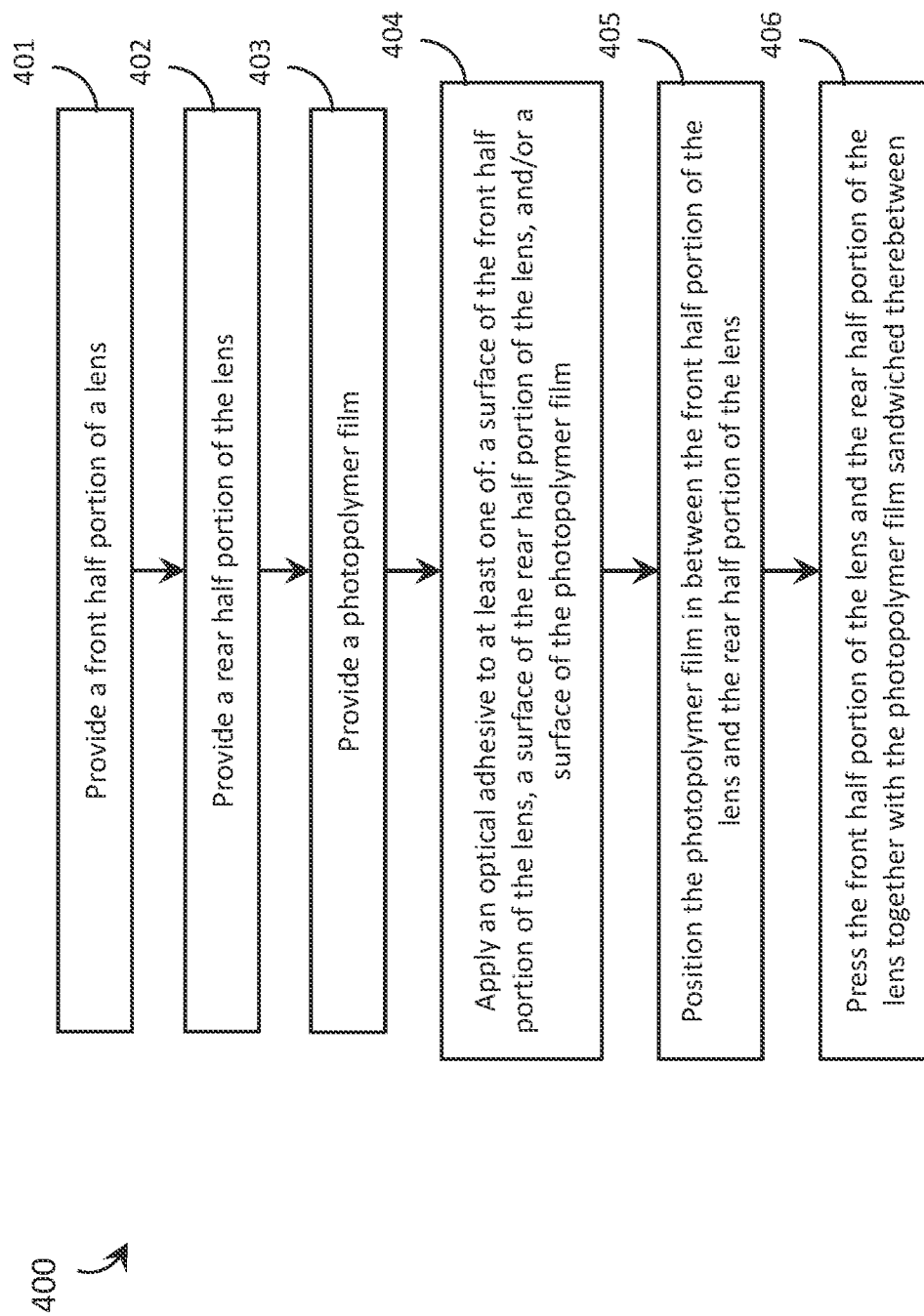
FIG. 4 is a flow-diagram showing an exemplary method of manufacturing a lens for use in a wearable heads-up display in accordance with the present systems, articles, and methods.

FIG. 4 is a flow-diagram showing an exemplary method 400 of manufacturing a lens for use in a WHUD in accordance with the present systems, articles, and methods. Method 400 includes six acts 401, 402, 403, 404, 405, and 406, though those of skill in the art will appreciate that in alterative embodiments certain acts may be omitted and/or additional acts may be added. Those of skill in the art will also appreciate that the illustrated order of the acts is shown for exemplary purposes only and may change in alternative embodiments.

At 401, a front half portion of a lens is provided. The front half portion of the lens includes the surface of the lens that will be outward-facing when the lens is incorporated into a WHUD frame and worn on the head of a user.

At 402, a rear half portion of the lens is provided. The rear half portion of the lens includes the surface of the lens that will be inward-facing (i.e., most proximate the eye of the user) when the lens is incorporated into a WHUD frame and worn on the head of the user. While the integration of the photopolymer film with the lens does not involve a molding/casting process in method 400, a person of skill in the art will appreciate that either or both of the front half portion of the lens and/or the rear half portion of the lens may, prior to method 400, be formed by a molding/casting process.

At 403, a photopolymer film is provided. The photopolymer film may be unrecorded or recorded (i.e., the photopolymer film may already include a hologram recorded therein/thereon or the photopolymer film may not yet include a hologram recorded therein/thereon).

At 404, an optical adhesive (or other bonding agent or bonding process, as previously described) is applied to at least one of (i.e., at least one surface selected from a group consisting of): a surface of the front half portion of the lens (i.e., the surface of the front half portion of the lens that is opposite the surface of the front half portion of the lens that will be outward-facing when the lens is incorporated into a WHUD frame and worn on the head of a user), a surface of the rear half portion of the lens (i.e., the surface of the rear half portion of the lens that is opposite the surface of the rear half portion of the lens that will be inward-facing when the lens is incorporated into a WHUD frame and worn on the head of a user), and/or a surface of the photopolymer film. Throughout this specification and the appended claims, the term "optical adhesive" refers to an adhesive that is or becomes optically transparent when cured, such as (for example) Norland® Optical Adhesive.

At 405, the photopolymer film is positioned in between the front half portion of the lens and the rear half portion of the lens. Equivalently, the front half portion of the lens and the rear half portion of the lens may respectively be positioned on opposite sides of the photopolymer film to result in the photopolymer film being positioned in between the front half portion of the lens and the rear half portion of the lens. In some implementations, a curvature may be applied to the photopolymer film before or during act 405 (and either before or after act 404). As before, curvature may be applied using conventional techniques for forming/shaping film, for example, by applying heat and targeted air flow (e.g., a pressure differential).

At 406, the front half portion of the lens and the rear half portion of the lens are pressed together with the photopolymer film sandwiched in between. During or after this pressing, the optical adhesive from act 403 may be cured. "Pressing the front half portion of the lens and the rear half portion of the lens together" includes pressing the front half portion of the lens against the rear half portion of the lens and/or pressing the rear half portion of the lens against the front half portion of the lens. In some implementations, the optical adhesive may be pressure-sensitive and cured by the pressing of act 406. In other implementations, the optical adhesive may be cured by other means, such as by exposure to ultraviolet light.

As previously described, one or more hologram(s) may be recorded into/onto the photopolymer either before or after the photopolymer is integrated with the lens. If the hologram(s) is/are recorded before the photopolymer film is integrated with the lens (i.e., before at least act 405 of method 400), then the hologram(s) may be designed to accommodate and/or compensate for at least one optical effect introduced by at least one of the front half portion of the lens and/or the rear half portion of the lens, or by the curvature of the hologram itself when integrated with the lens. If the hologram(s) is/are recorded after the photopolymer film is integrated with the lens (i.e., after act 406 of method 400), then the photopolymer film is highly photosensitive throughout the integration process (i.e., throughout method 400) and, accordingly, at least acts 403, 405, and 406 (as well as act 404 if the optical adhesive is applied to a surface of the photopolymer film) should be performed in a dark environment.

As also previously described, an eyeglass prescription may be added to the lens after the photopolymer has been integrated with the lens. In this case, method 400 may be extended to include applying an eyeglass prescription to at least one of the front half portion of the lens and/or the rear half portion of the lens after act 406.

Figure 5:
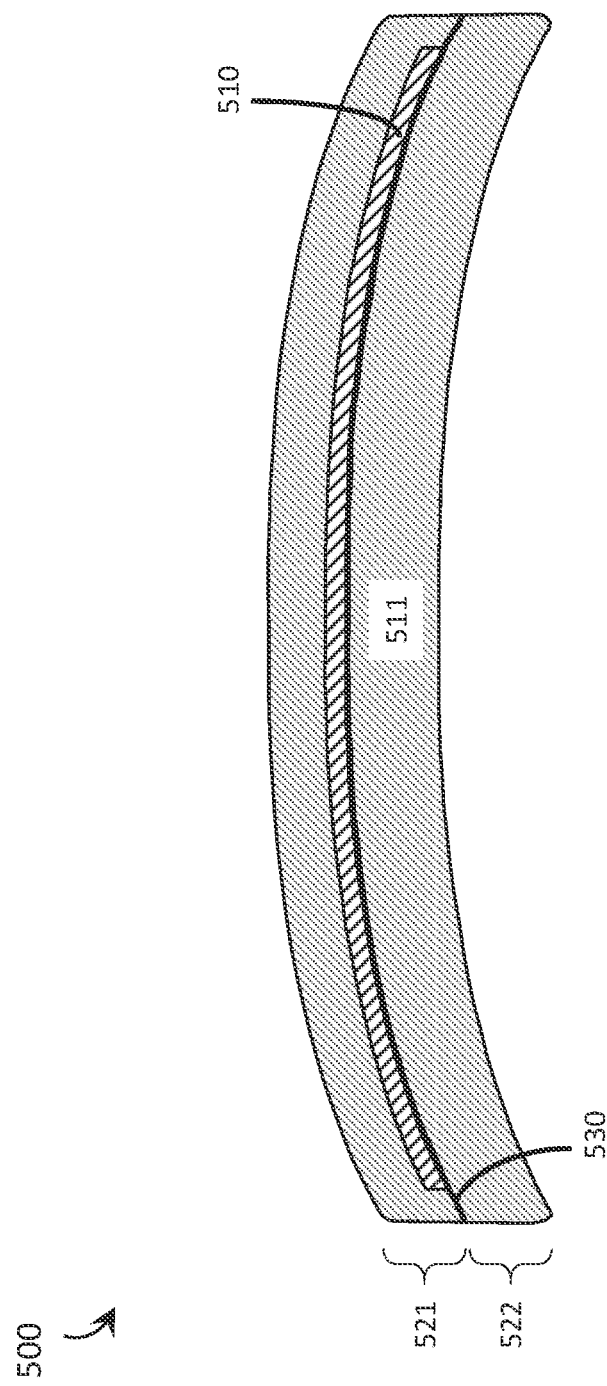
FIG. 5 is a sectional view showing a lens for use in a wearable heads-up display, the lens having been manufactured or prepared by an implementation of the method from FIG. 4.

FIG. 5 is a sectional view showing a lens 500 for use in a WHUD, lens 500 having been manufactured or prepared by an implementation of method 400. That is, FIG. 5 shows a lens 500 resulting from the acts of: providing a front half portion of a lens; providing a rear half portion of the lens; providing a photopolymer film; applying an optical adhesive (or other bonding agent or bonding process) to at least one of (i.e., at least one surface selected from a group consisting of): a surface of the front half portion of the lens, a surface of a rear half portion of the lens, and a surface of the photopolymer film; positioning the photopolymer film in between the front half portion of the lens and the rear half portion of the lens; and pressing the front half portion of the lens and the rear half portion of the lens together with the photopolymer film sandwiched therebetween. Similar to lens 300 from FIG. 3 (prepared by an implementation of method 200), lens 500 includes a photopolymer film 510 completely encompassed by lens material 511, though in alternative implementations one or more portion(s) of photopolymer film may reach or even protrude from the perimeter of lens 500. However, because method 500 involves pressing (per act 406) two separate halves of a lens together with photopolymer film 510 positioned (per act 405) therebetween, lens 500 also includes an interface 530 between the front half portion 521 of the lens 500 and the rear half portion 522 of the lens 500, whereas the molding approach of method 200 does not produce a similar interface in the volume of lens 300 shown in FIG. 3.

As an alternative to integrating photopolymer film with a lens by embedding the photopolymer film within the inner volume of the lens (per method 200 and/or method 400), photopolymer film maybe integrated with a lens by affixing or laminating the photopolymer film to an outer surface of the lens. In other words, an existing lens may be adapted for use in a WHUD by applying photopolymer film to the lens.

Figure 6:
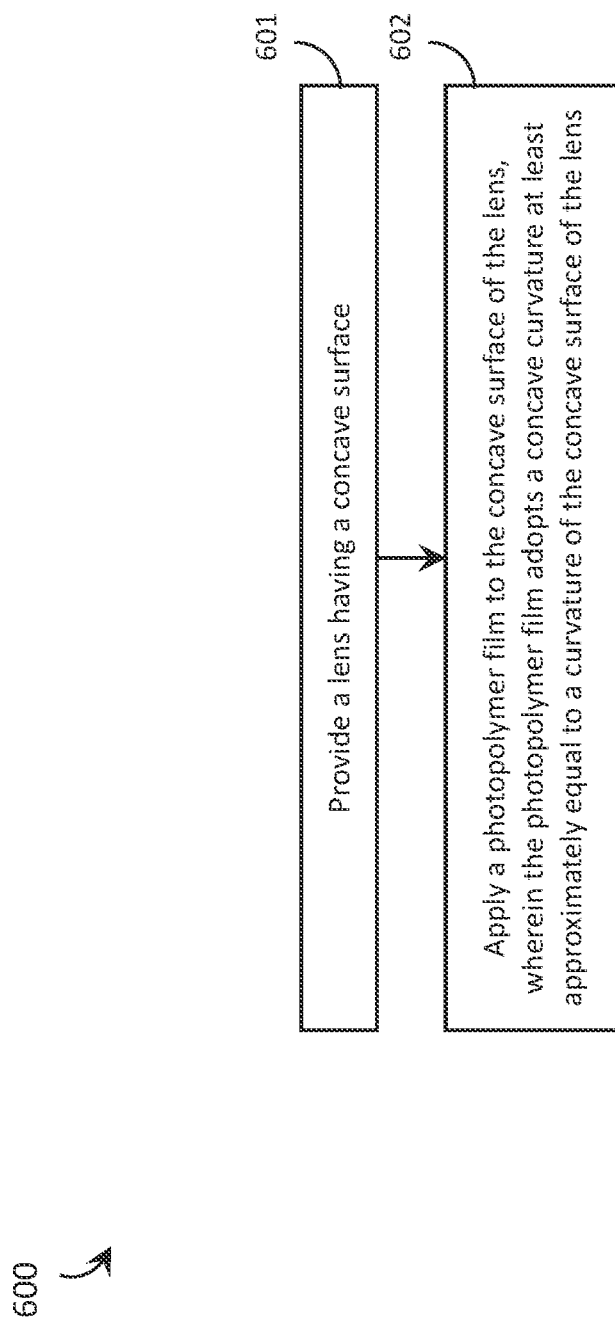
FIG. 6 is a flow-diagram showing an exemplary method of adapting a lens for use in a wearable heads-up display in accordance with the present systems, articles, and methods.

FIG. 6 is a flow-diagram showing an exemplary method 600 of adapting a lens for use in a WHUD in accordance with the present systems, articles, and methods. Method 600 includes two acts 601 and 602, though those of skill in the art will appreciate that in alterative embodiments certain acts may be omitted and/or additional acts may be added. Those of skill in the art will also appreciate that the illustrated order of the acts is shown for exemplary purposes only and may change in alternative embodiments.

At 601, a lens having a concave surface is provided. Similar to lenses 100, 300, and 500, the concave surface may correspond to the "inward-facing" surface of the lens (i.e., the surface of the lens that is most proximate the eye of the user) when the lens is incorporated into a WHUD and worn on the head of a user.

At 602, a photopolymer film is applied to the concave surface of the lens. The photopolymer film adopts a concave curvature at least approximately equal to a curvature of the concave surface of the lens. In some implementations, the photopolymer film may adopt the concave curvature as it is applied (i.e., by virtue of being applied) to the concave surface of the lens, whereas in other implementations the photopolymer film may be shaped/formed to adopt the concave curvature before it is applied to the concave surface of the lens. Three techniques for applying the photopolymer film to the concave surface of the lens are now described.

In a first implementation of method 600, act 602 of method 600 may include: providing the photopolymer film; applying an optical adhesive (or other bonding agent or bonding process) to at least one of the concave surface of the lens and/or a surface of the photopolymer film; pressing the concave surface of the lens and the surface of the photopolymer film together; and curing the optical adhesive. As described previously, pressing the concave surface of the lens and the surface of the photopolymer film together may include pressing the concave surface of the lens against the surface of the photopolymer film and/or pressing the surface of the photopolymer film against the concave surface of the lens. In some implementations, a curved object (i.e., a curved press) may be used to directly press the surfaces together in a direction perpendicular to the interface of the lens and film, whereas in other implementations one or more roller(s) may be used to press/laminate across the interface of the lens and film. Pressing the concave surface of the lens and the surface of the photopolymer film together may include warming the photopolymer film. As described previously, if a hologram has already been recorded into the photopolymer then the photopolymer may be warmed to a relatively high temperature (e.g., up to about 200° C.), whereas if a hologram has not yet been recorded into the photopolymer then warming during pressing should be limited to under about 80° C. (where the term "about" in this specification generally means within 15%).

Curing the optical adhesive may include any or all of: exposure to UV light, exposure to heat/cold, drying by exposure to circulating gas(es), addition of one or more chemical curing agent(s) (e.g., stiffener or hardening agent), and/or passage of time.

In a second implementation of method 600, act 602 of method 600 may include: applying the photopolymer film to a surface of a carrier; curving the carrier to provide a concave curvature that at least approximately matches the concave surface of the lens; applying an optical adhesive (or other bonding agent or bonding process) to at least one of: the concave surface of the lens, a surface of the photopolymer film, and a surface of the carrier; pressing the concave surface of the lens and the carrier, with the photopolymer film thereon, together to sandwich the optical adhesive; and curing the optical adhesive. If desired (and feasible, provided the carrier surface is an exposed surface after the adhesion is complete), the carrier may be removed (e.g., etched, peeled away, or similar) after the photopolymer film has been adhered to the concave surface of the lens. Curving the carrier may include, for example, warming the photopolymer film (i.e., to a temperature below about 80° C. if unrecorded, or to a temperature below about 200° C. if recorded); and pressing the carrier, with the photopolymer film thereon, over a curved surface, the curved surface having a curvature that at least approximately matches or mates with the concave surface of the lens.

In a third implementation of method 600, act 602 of method 600 may include: depositing the photopolymer film directly on the concave surface of the lens by at least one thin film deposition technique. Exemplary thin film deposition techniques that may be suitable for this application include, without limitation: spin-coating, dip-coating, and/or vacuum deposition.

In methods 200 and 400, the photopolymer film is integrated with the lens during the formation of the lens itself. Accordingly, for methods 200 and 400, if an eyeglass prescription is desired then the eyeglass prescription is added/applied to the lens after the photopolymer film is integrated therewith. Conversely, in method 600 an existing lens is adapted for use in a WHUD by affixing a photopolymer film thereon. Accordingly, an eyeglass prescription (if desired) may be applied to the lens before act 602 of method 600 (i.e., before the photopolymer film is applied to the concave surface of the lens).

As previously described, one or more hologram(s) may be recorded into/onto the photopolymer either before or after the photopolymer is integrated with the lens. If the hologram (s) is/are recorded before the photopolymer film is integrated with the lens (i.e., before at least act 602 of method 600), then the hologram(s) may be designed to accommodate and/or compensate for an optical effect of the lens and/or an optical effect of the curvature of the hologram itself. If the hologram(s) is/are recorded after the photopolymer film is integrated with the lens (i.e., after act 602 of method 600), then the photopolymer film is highly photosensitive throughout the integration process (i.e., throughout method 600) and, accordingly, at least act 602 should be performed in a dark environment.

Figure 7:
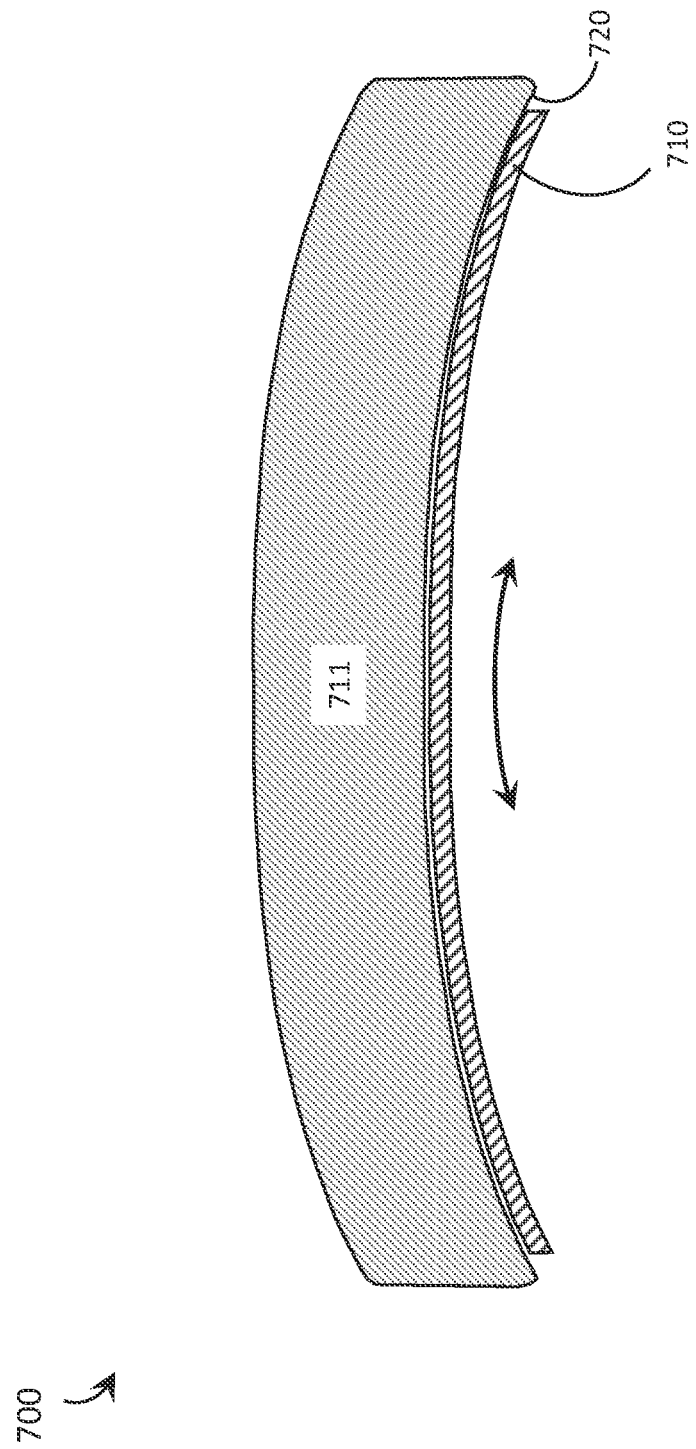
FIG. 7 is a sectional view showing an adapted lens for use in a wearable heads-up display, the lens having been adapted or prepared by an implementation of the method from FIG. 6.

FIG. 7 is a sectional view showing an adapted lens 700 for use in a WHUD, lens 700 having been adapted or prepared by an implementation of method 600. That is, FIG. 7 shows an adapted lens 700 resulting from the acts of: providing a lens 711 having a concave surface 720; and applying a photopolymer film 710 to concave surface 720 of lens 711, wherein photopolymer film 710 adopts a concave curvature (represented by the double-arrow in FIG. 7) at least approximately equal to the curvature of concave surface 720 of lens 711.

Methods 200, 400, and 600 (and consequently lenses 300, 500, and 700) all may involve applying a curvature to the photopolymer film, or generally ending up with a curved photopolymer film. In practice, in can be very difficult to design a hologram for use on a curved surface. Either the hologram must be recorded on the curved surface of the photopolymer (which adds significant complexity to the holography process) or the hologram may be recorded while the photopolymer is flat/planar but the hologram itself must accommodate/compensate for/anticipate the curvature that will subsequently be applied to the photopolymer (which adds significant complexity to the hologram definition). To avoid the issue of curved photopolymer, the present systems, articles, and methods include adapted eyeglass lenses that are integrated with a planar photopolymer.

Figure 8:
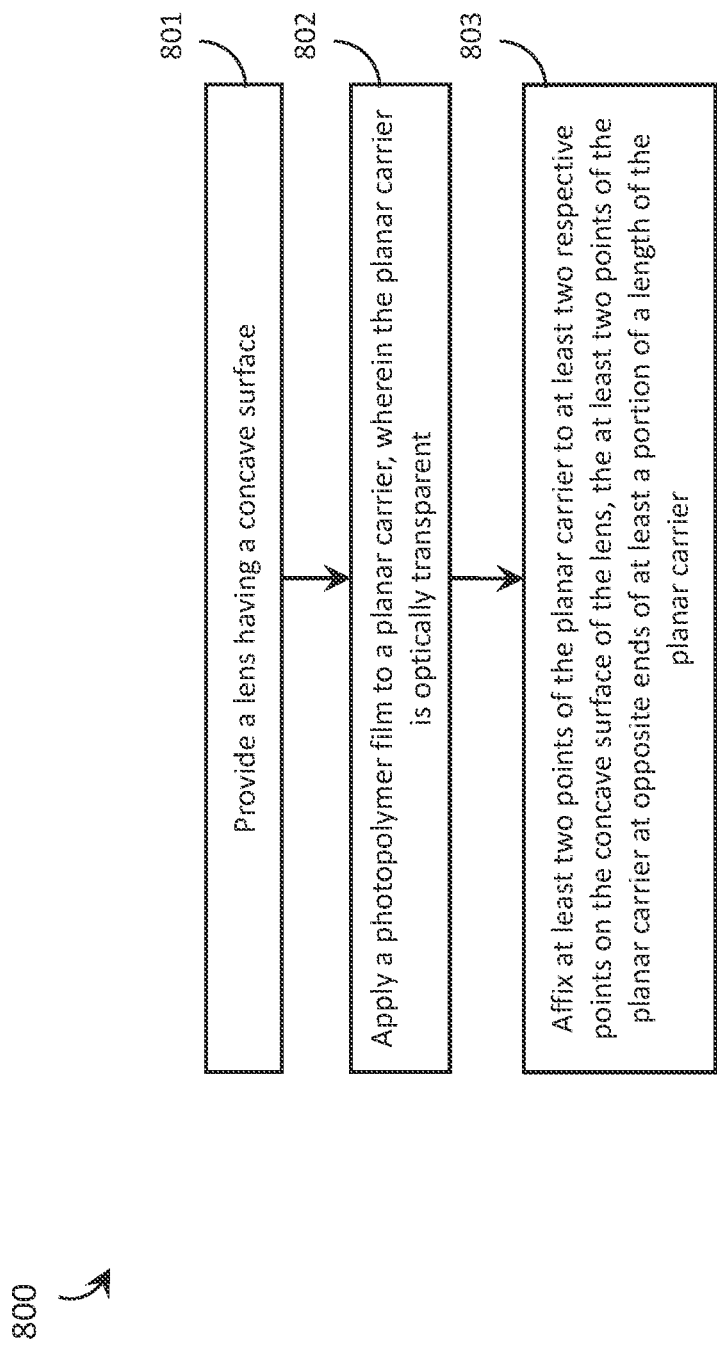
FIG. 8 is a flow-diagram showing an exemplary method of adapting a lens for use in a wearable heads-up display in accordance with the present systems, articles, and methods.

FIG. 8 is a flow-diagram showing an exemplary method 800 of adapting a lens for use in a WHUD in accordance with the present systems, articles, and methods. Method 800 includes three acts 801, 802, and 803, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 801, a lens having a concave surface is provided, similar to act 601 from method 600. The concave surface may correspond to the "inward-facing" surface of the lens (i.e., the surface of the lens that is most proximate the eye of the user) when the lens is incorporated into a WHUD and worn on the head of a user.

At 802, a photopolymer film is applied to a planar carrier. The planar carrier is optically transparent and may be substantially rigid. Applying the photopolymer film to the planar carrier may include adhering the photopolymer film to the planar carrier using a bonding agent, such as an optical adhesive, or using a thin film deposition technique (such as spin-coating, dip-coating, or vacuum deposition) to directly deposit the photopolymer film on a surface of the planar carrier. Act 602 produces a structure similar to a transparent slide with a film of photopolymer carried on a surface thereof.

At 803, at least two points of the planar carrier are affixed to at least two respective points on the concave surface of the lens. The at least two points of the planar carrier may be at opposite ends of at least a portion of a length of the planar carrier. The at least two points of the planar carrier may be two lines that span the width of the planar carrier. The at least two points on the carrier may be two edges of the planar carrier at opposite ends of the length of the planar carrier (e.g., the two short edges of a rectangle, if the planar carrier has a rectangular geometry). In some implementations, the entire perimeter of the planar carrier may be affixed to the concave surface of the lens (e.g., if the planar carrier has a curved geometry).

Because the carrier is planar and it is affixed (at 803) to at least two points on the concave surface of the lens, the carrier spans straight across the concave surface of the lens to define a cavity in between the concave surface of the lens and the planar carrier. Affixing at least two points of the planar carrier to at least two respective points on the concave surface of the lens at 803 may include adhering at least two points of the planar carrier to at least two respective points on the concave surface of the lens using a bonding agent, such as an optical adhesive.

In some implementations, method 800 may include, in between acts 802 and 803, cutting or etching or otherwise forming a recess in the concave surface of the lens, the recess being sized and dimensioned to receive the planar carrier upon which the photopolymer film is carried. In such implementations, affixing at least two points of the planar carrier to at least two respective points on the concave surface of the lens may include: i) positioning the planar carrier within the recess in the concave surface of the lens, and ii) affixing the planar carrier within the recess in the concave surface of the lens via a bonding agent and/or a bonding process. Optionally, method 800 may then also be extended to include overmolding or otherwise filling any remaining volume of the recess with lens material to restore a smooth (and optionally concave) surface on the lens where the recess was cut/etched.

Similar to method 600, in method 800 an existing lens is adapted for use in a WHUD by affixing a photopolymer film thereto (at 803). Accordingly, an eyeglass prescription (if desired) may be applied to the lens before act 803 of method 800 (i.e., before the at least two points of the planar carrier are affixed to at least two respective points on the concave surface of the lens).

As previously described, one or more hologram(s) may be recorded into/onto the photopolymer either before or after the photopolymer is integrated with the lens. If the hologram(s) is/are recorded before the photopolymer film is integrated with the lens (i.e., before at least act 803 of method 800), then the hologram(s) may be designed to accommodate and/or compensate for an optical effect of the lens. If the hologram(s) is/are recorded after the photopolymer film is integrated with the lens (i.e., after act 803 of method 800), then the photopolymer film is highly photosensitive throughout the integration process (i.e., throughout method 800) and, accordingly, at least acts 802 and 803 should be performed in a dark environment.

Figure 9:
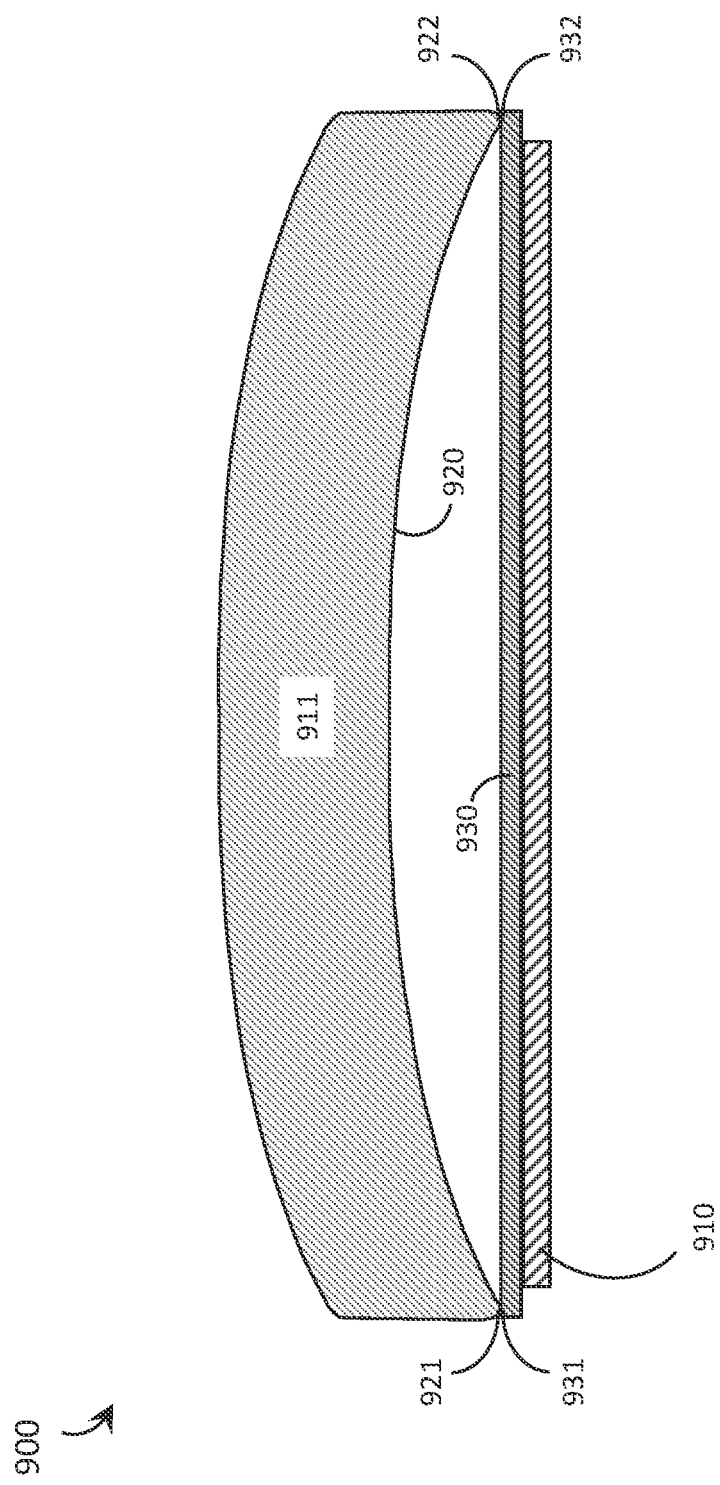
FIG. 9 is a sectional view showing an adapted lens for use in a wearable heads-up display, the lens having been adapted or prepared by an implementation of the method from FIG. 8.

FIG. 9 is a sectional view showing an adapted lens 900 for use in a WHUD, lens 900 having been adapted or prepared by an implementation of method 800. That is, FIG. 9 shows an adapted lens 900 resulting from the acts of: providing a lens 911 having a concave surface 920; applying a photopolymer film 910 to a planar carrier 930, wherein planar carrier 930 is optically transparent; and affixing at least two points 931, 932 of planar carrier 930 to at least two respective points 921, 922 on concave surface 920 of lens 911, the at least two points 931, 932 of planar carrier 930 at opposite ends of at least a portion of a length of planar carrier 930.

In methods/applications involving a carrier, photopolymer may be bound to the carrier using a lamination process.

Any number of various coatings may be applied to either or both surfaces of any of the lenses (e.g., lens 100, lens 300, les 500, les 700, and/or lens 900) described in the present systems, articles, and methods. Examples of such coatings include, without limitation, hard-coatings (to reduce susceptibility to scratches), anti-reflective coatings, and/or reflective coatings. To this end, each of the methods described herein (e.g., method 200, method 400, method 600, and/or method 800) may be extended to include the application of such coating(s).

In implementations for which photopolymer film is integrated with a lens while the film remains "unrecorded," and for which one or more hologram(s) is/are recorded into the photopolymer film while the photopolymer film is integrated with the lens, thermal expansion of the lens material itself may need to be accounted for during the hologram recording process. The recording of a hologram in photopolymer film typically employs one or more lasers that, during recording, may heat the lens material upon or within which the photopolymer film is carried, causing the lens material to expand according to its characteristic coefficient of thermal expansion and thereby shifting a position of, or stretching, the photopolymer film itself. For this reason, a lens material having a particularly low coefficient of thermal expansion (such as a glass material) can be advantageous in implementations for which one or more hologram(s) will be recorded into the photopolymer film after the photopolymer film is integrated with the lens.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Non-Provisional patent application Ser. No. 15/256,148, U.S. Non-Provisional patent application Ser. No. 15/796,209, U.S. Non-Provisional patent application Ser. No. 15/796,218, U.S. Non-Provisional patent application Ser. No. 15/796,223, U.S. Provisional Patent Application Ser. No. 62/214,600, US Patent Application Publication US 2015-0205134 A1, U.S. Non-Provisional patent application Ser. No. 14/749,341 (now US Patent Application Publication US 2015-0378164 A1), U.S. Provisional Patent Application Ser. No. 62/117,316 (now US Patent Application Publication US 2016-0238845 A1 and U.S. Non-Provisional patent application Ser. Nos. 15/046,234 and 15/046,254), U.S. Provisional Patent Application Ser. No. 62/134,347 (now U.S. Non-Provisional patent application Ser. No. 15/070,887), U.S. Provisional Patent Application Ser. No. 62/156,736 (now U.S. Non-Provisional patent application Ser. Nos. 15/145,576, 15/145,609, and 15/145,583), and U.S. Provisional Patent Application Ser. No. 62/167,767 (now U.S. Non-Provisional patent application Ser. Nos. 15/167,458, 15/167,472, and 15/167,484), are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of manufacturing a lens for use in a wearable heads-up display, the method comprising:
   providing a photopolymer film;
   recording a hologram into the photopolymer film;
   applying a curvature to the photopolymer film;
   molding a lens-forming material to produce a first portion of the lens having the photopolymer film embedded therein;
   providing a second portion of the lens;

adhering a surface of the second portion of the lens and a first surface of the first portion of the lens together by a first portion of optical adhesive; and applying an eyeglass prescription curvature to the lens, wherein the hologram is configured to compensate for at least one of an optical effect of the eyeglass prescription curvature or an optical effect of the curvature applied to the photopolymer film.

2. The method of claim 1, where recording the hologram comprises:
recording the hologram while the photopolymer film is planar.

3. The method of claim 1, wherein the first portion of the lens comprises a front half portion of the lens and the first surface of the first portion of the lens is a concave surface, and wherein adhering the surface of the second portion of the lens and the first surface of the first portion of the lens together by the first portion of optical adhesive includes adhering the concave surface of the first portion of the lens and the surface of the second portion of the lens together by the first portion of optical adhesive.

4. The method of claim 3, wherein the second portion of the lens comprises a rear half portion of the lens and the surface of the second portion of the lens is a convex surface, and wherein adhering the surface of the second portion of the lens and the first surface of the first portion of the lens together by the first portion of optical adhesive includes adhering the convex surface of the second portion of the lens and the first surface of the first portion of the lens together by the first portion of optical adhesive.

5. The method of claim 1, wherein the first portion of the lens comprises a front half portion of the lens and the first surface of the first portion of the lens is a convex surface, and wherein adhering the surface of the second portion of the lens and the first surface of the first portion of the lens together by the first portion of optical adhesive includes adhering the convex surface of the first portion of the lens and the surface of the second portion of the lens together by the first portion of optical adhesive.

6. The method of claim 5 wherein the second portion of the lens comprises a rear half portion of the lens and the surface of the second portion of the lens is a concave surface, and wherein adhering the surface of the second portion of the lens and the first surface of the first portion of the lens together by the first portion of optical adhesive includes adhering the concave surface of the second portion of the lens and the first surface of the first portion of the lens together by the first portion of optical adhesive.

7. The method of claim 1, wherein the curvature is applied to the photopolymer film before molding the lens-forming material to produce the first portion of the lens and before adhering the surface of the second portion of the lens and the surface of the first portion of the lens together by the first portion of optical adhesive.

8. The method of claim 1, wherein providing the photopolymer film comprises:
providing a photopolymer film comprising a carrier with the photopolymer film applied thereon, and
wherein applying a curvature to the photopolymer film includes warming the photopolymer film to a temperature below about 80 degrees Celsius; and
pressing the carrier, with the photopolymer film thereon, over a curved surface.

9. The method of claim 1, further comprising:
applying at least one coating to at least one surface, the at least one surface comprising one or more of a surface of the first portion of the lens or a surface of the second portion of the lens.

10. The method of claim 1, wherein adhering the surface of the second portion of the lens and the first surface of the first portion of the lens together by the first portion of optical adhesive includes applying a first portion of optical adhesive to at least one surface, the at least one surface comprising one or more of the first surface of the first portion of the lens or the surface of the second portion of the lens.

11. The method of claim 1, wherein adhering the surface of the second portion of the lens and the first surface of the first portion of the lens together by the first portion of optical adhesive includes pressing the first surface of the first portion of the lens and the surface of the second portion of the lens together.

12. The method of claim 1, wherein adhering the surface of the second portion of the lens and the first surface of the first portion of the lens together by the first portion of optical adhesive includes curing the first portion of optical adhesive.

13. The method of claim 1, further comprising:
providing a third portion of the lens; and
adhering a surface of the third portion of the lens and a second surface of the first portion of the lens together by a first portion of optical adhesive.

14. The method of claim 1, wherein molding a lens-forming material to produce a first portion of the lens having the photopolymer film embedded therein includes:
providing a lens mold having a cavity;
positioning the photopolymer film within the cavity of the lens mold;
casting a lens-forming material into the cavity; and
curing the lens-forming material within the cavity to form a first portion of the lens having the photopolymer film embedded therein, the first portion of the lens having dimensions and a geometry at least approximately equal to the cavity.

15. A wearable heads-up display having a lens manufactured according to the method of claim 1.

16. A method of manufacturing a lens for use in a wearable heads-up display, the method comprising:
providing a photopolymer film;
recording a hologram into the photopolymer film, the hologram configured to compensate for at least an optical effect of an eyeglass prescription curvature subsequently applied to the lens;
molding a lens-forming material to produce a first portion of the lens having the photopolymer film embedded therein;
providing a second portion of the lens; and
adhering a surface of the second portion of the lens and a first surface of the first portion of the lens together by a first portion of optical adhesive.

* * * * *